US011328594B2

(12) United States Patent
Kaneko et al.

(10) Patent No.: US 11,328,594 B2
(45) Date of Patent: May 10, 2022

(54) INFORMATION PROCESSING APPARATUS AND INFORMATION PROCESSING METHOD

(71) Applicant: TOYOTA JIDOSHA KABUSHIKI KAISHA, Toyota (JP)

(72) Inventors: Yusuke Kaneko, Toyota (JP); Junya Masui, Nagoya (JP); Yui Nakamura, Nagoya (JP); Ai Fujimura, Nisshin (JP); Keisuke Tsujimoto, Toyota (JP); Tomoyuki Kuriyama, Hadano (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 420 days.

(21) Appl. No.: 16/429,915

(22) Filed: Jun. 3, 2019

(65) Prior Publication Data
US 2019/0385451 A1  Dec. 19, 2019

(30) Foreign Application Priority Data
Jun. 14, 2018 (JP) .............................. JP2018-113439

(51) Int. Cl.
*G01C 21/00* (2006.01)
*G08G 1/0968* (2006.01)
*G06Q 50/30* (2012.01)
*G06Q 10/06* (2012.01)

(52) U.S. Cl.
CPC . *G08G 1/096883* (2013.01); *G06Q 10/06316* (2013.01); *G06Q 50/30* (2013.01); *G06Q 2240/00* (2013.01)

(58) Field of Classification Search
CPC ....... G08G 1/096883; G06Q 10/06316; G06Q 50/30; G06Q 2240/00
See application file for complete search history.

(56) References Cited

U.S. PATENT DOCUMENTS

2017/0351990 A1  12/2017  Hecht et al.
2019/0311307 A1* 10/2019  Ramot ................. G01C 21/343
2020/0001892 A1*  1/2020  Aoi ....................... B60W 50/08

FOREIGN PATENT DOCUMENTS

JP  2004-062490 A  2/2004
JP  2019-133354 A  8/2019

* cited by examiner

*Primary Examiner* — Adam M Alharbi
(74) *Attorney, Agent, or Firm* — Oliff PLC

(57) ABSTRACT

An information processing apparatus determines a pickup point and a drop-off point for a first user traveling to a destination in a vehicle carrying a plurality of unspecified users. The apparatus includes a controller that obtains information on the place of departure and the destination of the first user; determines a pickup point for the first user based on the place of departure of the first user; defines a predetermined field including the destination of the first user and determines a drop-off point for the first user from a plurality of points except the destination, the points being included in the predetermined field; and transmits the determined pickup point and drop-off point for the first user to a device associated with the vehicle.

4 Claims, 13 Drawing Sheets

FIRST USER INFORMATION

| USER ID | PLACE OF DEPARTURE | DESTINATION | TRAVEL STARTING DATE AND TIME |
|---|---|---|---|
| U101 | (Lat_s_0, Lon_s_0) | (Lat_d_0, Lon_d_0) | t_0 |
| U102 | (Lat_s_1, Lon_s_1) | (Lat_d_1, Lon_d_1) | t_1 |
| U103 | (Lat_s_2, Lon_s_2) | (Lat_d_2, Lon_d_2) | t_2 |
| ... | ... | ... | ... |

FIG. 4

SECOND USER INFORMATION

| USER ID | TRAVELING ROUTE | TRAVEL STARTING DATE AND TIME |
|---------|-----------------|-------------------------------|
| U201 | (Traveling route_0) | t_0 |
| U202 | (Traveling route_1) | t_1 |
| U203 | (Traveling route_2) | t_2 |
| ... | ... | ... |

FIG. 5

ROAD ENVIRONMENT INFORMATION

| ROAD SEGMENT ID | POSITIONAL INFORMATION | SIDEWALKS | ROAD WIDTH | TRAFFIC LANES | TRAFFIC DENSITY | ONE-WAY | ... |
|---|---|---|---|---|---|---|---|
| S001 | (POSITION AND DIRECTION) | PRESENT | 12m | 2 LANES | 200 VEHICLES/hr | NO | ... |
| ... | ... | | | | | | ... |

FIG. 9A

SPOT INFORMATION

| SPOT ID | POSITIONAL INFORMATION | TYPE | SIZE | RESTAURANT | BANK ATM | REST ROOM | ... |
|---|---|---|---|---|---|---|---|
| S101 | (POSITIONAL INFORMATION) | COMMERCIAL FACILITY | MIDDLE | PRESENT | ABSENT | PRESENT | ... |
| S102 | (POSITIONAL INFORMATION) | RAILWAY STATION | LARGE | PRESENT | PRESENT | PRESENT | ... |
| ... | ... | | | | | | ... |

FIG. 9B

INFORMATION PROCESSING APPARATUS AND INFORMATION PROCESSING METHOD

CROSS REFERENCE TO THE RELATED APPLICATION

This application claims the benefit of Japanese Patent Application No. 2018-113439, filed on Jun. 14, 2018, which is hereby incorporated by reference herein in its entirety.

BACKGROUND

Technical Field

The present invention relates to a technique that allows multiple users to travel together in the same vehicle.

Description of the Related Art

To relieve traffic congestion, save fuel costs, and reduce environmental damage, a way of traveling in which multiple passengers share one vehicle (ride-sharing) has become increasingly widespread in various countries. In addition, techniques that match multiple users are developed for such a way of traveling.

U.S. Patent Application Publication No. 2017/0351990 describes a related technique, which is a system that obtains data about interactions among multiple users who have traveled together in a vehicle and provides additional information on the basis of the interactions.

SUMMARY

Typical ride-sharing, in which strangers to each other travel in the same vehicle, raises an issue of privacy protection. For example, one passenger may desire to keep his/her home and office secret from the driver and the fellow passenger.

The present invention has been made to resolve the issue. An object of the invention is to protect the privacy of multiple users when they travel in the same vehicle.

An information processing apparatus according to a first aspect of the present invention determines a pickup point and a drop-off point for a first user traveling to a destination in a vehicle carrying a plurality of unspecified users.

The apparatus includes a controller that obtains information on a place of departure and a destination of the first user; determines a pickup point for the first user based on the place of departure of the first user; defines a predetermined field including the destination of the first user and determines a drop-off point for the first user from a plurality of points except the destination, the points being included in the predetermined field; and transmits the determined pickup point and drop-off point for the first user to a device associated with the vehicle.

An information processing method according to a second aspect of the present invention is implemented by an information processing apparatus for determining a pickup point and a drop-off point for a first user traveling to a destination in a vehicle carrying a plurality of unspecified users. The method includes: obtaining user information including information on a place of departure and a destination of the first user; determining a pickup point for the first user based on the place of departure of the first user; defining a predetermined field including the destination of the first user and determining a drop-off point for the first user from a plurality of points except the destination, the points being included in the predetermined field; and transmitting the determined pickup point and drop-off point for the first user to a device associated with the vehicle.

A third aspect of the present invention is a program that causes a computer to implement the information processing method or a computer-readable storage medium storing the program in a non-transitory manner.

The present invention can protect the privacy of multiple users who travel in the same vehicle.

BRIEF DESCRIPTION OF THE DRAWINGS

FIG. 4 illustrates an example of first user information stored in a first database.

FIG. 5 illustrates an example of second user information stored in a second database.

FIGS. 9A and 9B illustrate information stored in a road database.

DESCRIPTION OF THE EMBODIMENTS

Figure 1:
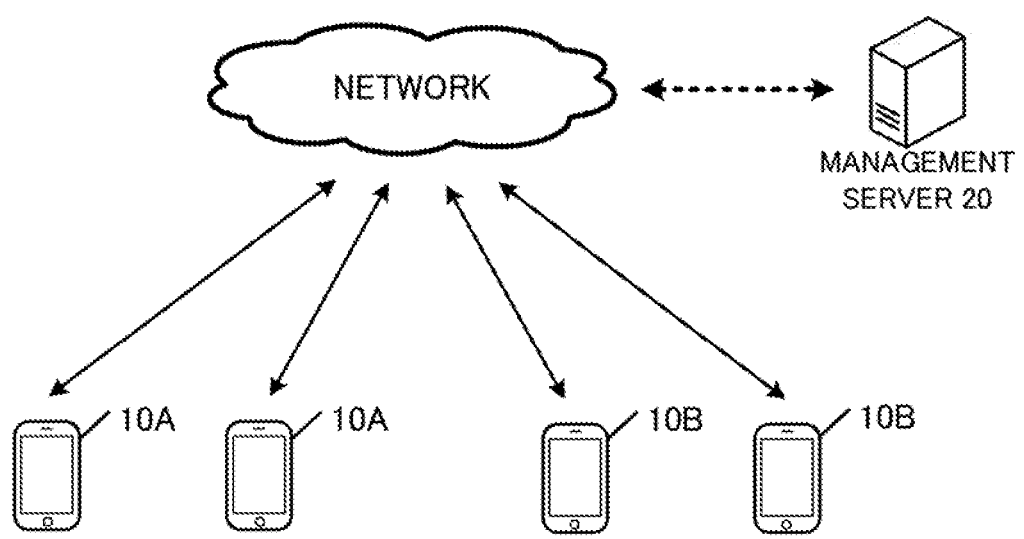
FIG. 1 is a schematic diagram of a matching system according to a first embodiment.

An information processing apparatus according to a first aspect of the present invention obtains information on the place of departure and the destination of a first user and determines the pickup point and the drop-off point for the first user on the basis of the information.

If the first user's actual drop-off point is the same as the destination of the user, information about the user's home and sphere of life may be learned by a person in the same vehicle. For example, if the drop-off point is the front of the apartment building including the user's home, the driver or the fellow passenger will find that the home is an apartment in the building. In ride-sharing, in which unspecified users travel together in a vehicle, individuals' privacy should be respected.

To resolve the issue, the information processing apparatus according to the first aspect of the present invention, when obtaining information on the destination (for example, the home) from a first user, defines a predetermined field including the destination and determines the point at which the first user actually gets out, within the predetermined field.

The predetermined field is preferably a sphere that can be walked through, for example, with a radius of about 500 m. The drop-off point may be determined at random or based on a predetermined criterion. Such a process enables the destination (for example, the home or office) of the first user to be concealed from the driver and the fellow passenger of the vehicle. Note that the first user's destination may not be the final destination of the first user.

The device associated with the vehicle may be a terminal owned by a second user driving the vehicle or an on-vehicle terminal that is incorporated in the vehicle and designates the traveling route of the vehicle. The vehicle may be a vehicle manually driven by a driver or a vehicle that travels autonomously. The on-vehicle terminal may be a navigation device or a computer for autonomous driving.

The drop-off point may be determined based on the geographical positional relationship with the destination. For example, the drop-off point may be a position where the destination of the first user cannot be directly seen. This increases the destination concealability.

Information on the environment surrounding the vehicle when the first user gets out may also be obtained, and the drop-off point may be determined based on the information on the surrounding environment.

The surrounding environment may relate to the road environment or the surrounding facilities and landmarks. For example, a point near to a particular facility designated by the first user may have priority. Alternatively, a road with a width or a traffic density equal to or greater than a specified amount may have priority.

The points on the roads within the predetermined field may also be given evaluation values based on the criterion selected by the first user, and the drop-off point may be determined based on the given evaluation values.

For example, evaluation values given based on the road environment and evaluation values given based on nearby facilities and landmarks may be used to select the point meeting the desire of the first user as a drop-off point.

Specific embodiments of the present invention will now be described with reference to the drawings. The hardware configuration, the module configuration, and the functional components described in each embodiment should not be construed as limiting the technical scope of the invention, unless otherwise noted.

First Embodiment

Figure 13:
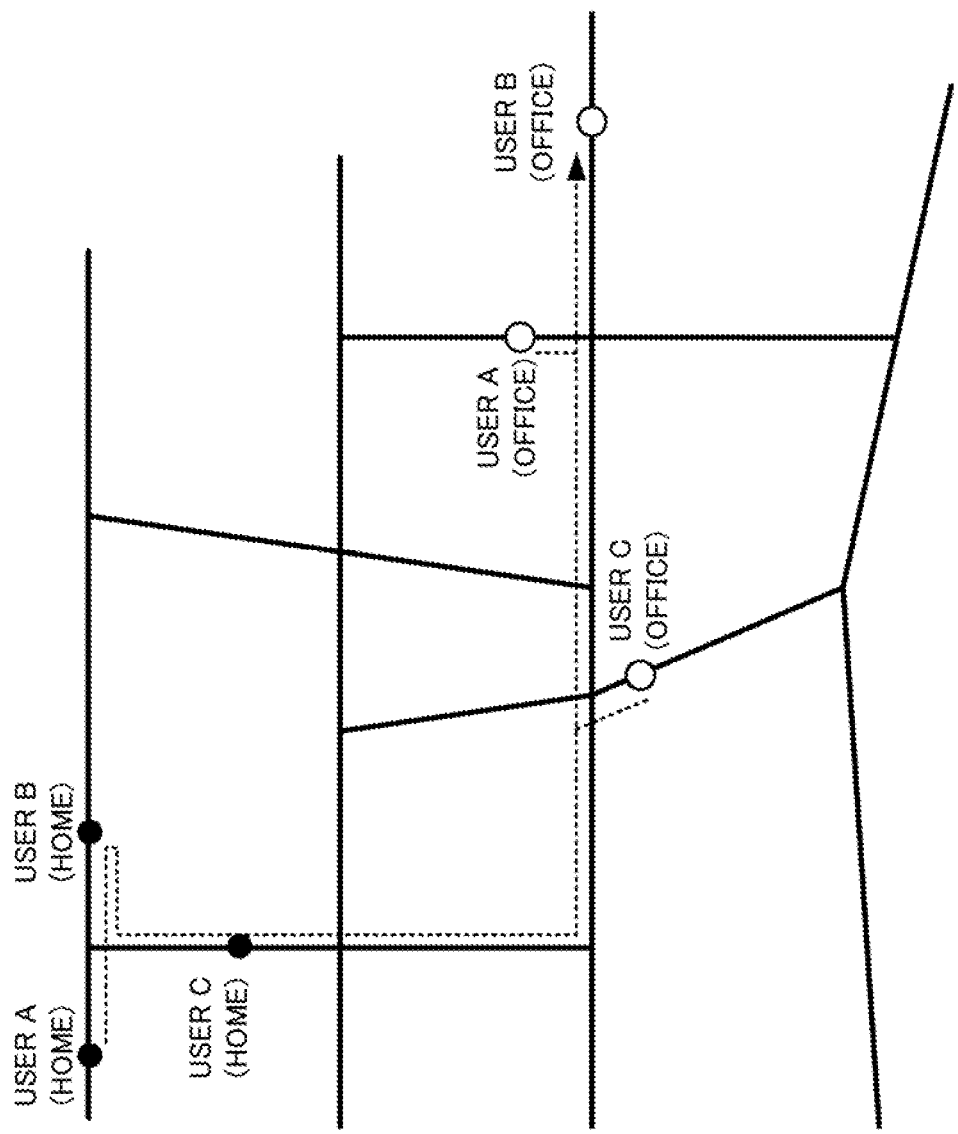
FIG. 13 illustrates an overview of ride-sharing.

A matching system according to a first embodiment will be schematically described first. FIG. 13 illustrates ride-sharing in which users travel together in a vehicle. FIG. 13 indicates the positions of the homes and the offices of three users who commute.

If the users commute separately, three cars will be needed. However, sharing a ride can reduce the number of vehicles driven. For example, user A, user B, and user C have homes in close proximity, and their offices are also near each other; thus, if their working hours start and end at roughly the same time, they can ride a share.

Such ride-sharing can reduce the number of vehicles on roads, relieving traffic congestion. In addition, for example, transportation costs needed for traveling in a vehicle (including fuel costs) may be shared by the users of the vehicle (cost-sharing). The cost-sharing can reduce the transportation costs per user compared with the case in which the users travel separately in their own vehicles.

FIG. 1 schematically illustrates a matching system according to the first embodiment. The matching system according to the present embodiment includes user terminals 10 carried by users and a management server 20.

In the present embodiment, a user who wants to share a vehicle with another person is referred to as a first user, and a user who drives the vehicle is referred to as a second user.

The user terminals 10 can switch between a mode for first users (hereinafter, the first mode) and a mode for second users (hereinafter, the second mode). A user terminal 10 operating in the first mode will be referred to as a user terminal 10A, as appropriate. Likewise, a user terminal operating in the second mode will be referred to as a user terminal 10B. Details of the operation in each mode will be described later.

The first users record information about the travelling of the first users in the management server 20 via the user terminals 10A. The information about the travelling of each first user includes, for example, the first user's place of departure, destination, and desired date and time for starting traveling.

The second users record information about the travelling of the second users in the management server 20 via the user terminals 10B. The information about the travelling of each second user is information about the travelling of the vehicle driven by the second user. For example, this information includes the traveling route and the date and time for the vehicle to start traveling. The information about the travelling of the first users and the information about the travelling of the second users are hereinafter referred to as traveling schedules.

For example, the information can be generated and recorded by application software installed in the user terminals 10 for using ride-sharing service. However, the information may not be recorded via mobile terminals. For example, the information may be recorded via any terminal connectable to a network (e.g., a smartphone, a mobile phone, a tablet terminal, a personal information terminal, a wearable computer) or a personal computer.

The management server 20 manages the traveling schedules recorded via the user terminals 10 and matches users. The management server 20 matches users on the basis of the recorded traveling schedules, and determines the traveling route of the vehicle driven by a second user, the point at which a first user rides in the vehicle, and the point at which the first user gets out.

The information resulting from the matching (hereinafter, the matching information) is transmitted to the user terminal 10A and the user terminal 10B. For example, the matching information includes information on the vehicle driven by the second user (e.g., the vehicle model, the color, the license plate information), information on the first and second users (e.g., sex, age), and travelling information (e.g., the place where the first user meets the vehicle, the meeting time, the route, the place where the first user gets out of the vehicle/the estimated time of arrival, the presence or absence of another passenger, traveling costs). When each of the users (the driver and the passenger) obtains the matching information and approves the matching, the matching is confirmed between the first user and the second user. The matching confirmation allows the user driving the vehicle to meet the user desiring to share the vehicle and travel together.

In the matching system according to the present embodiment, the user terminals 10A, the user terminals 10B, and the management server 20 are interconnected over a network. For example, the network may be a wide area network (WAN), which is a worldwide public network such as the Internet, or other communication network. The network may include a telephone communication network for mobile or other phones and a wireless communication network such as a Wi-Fi (registered trademark) network.

Figure 2:
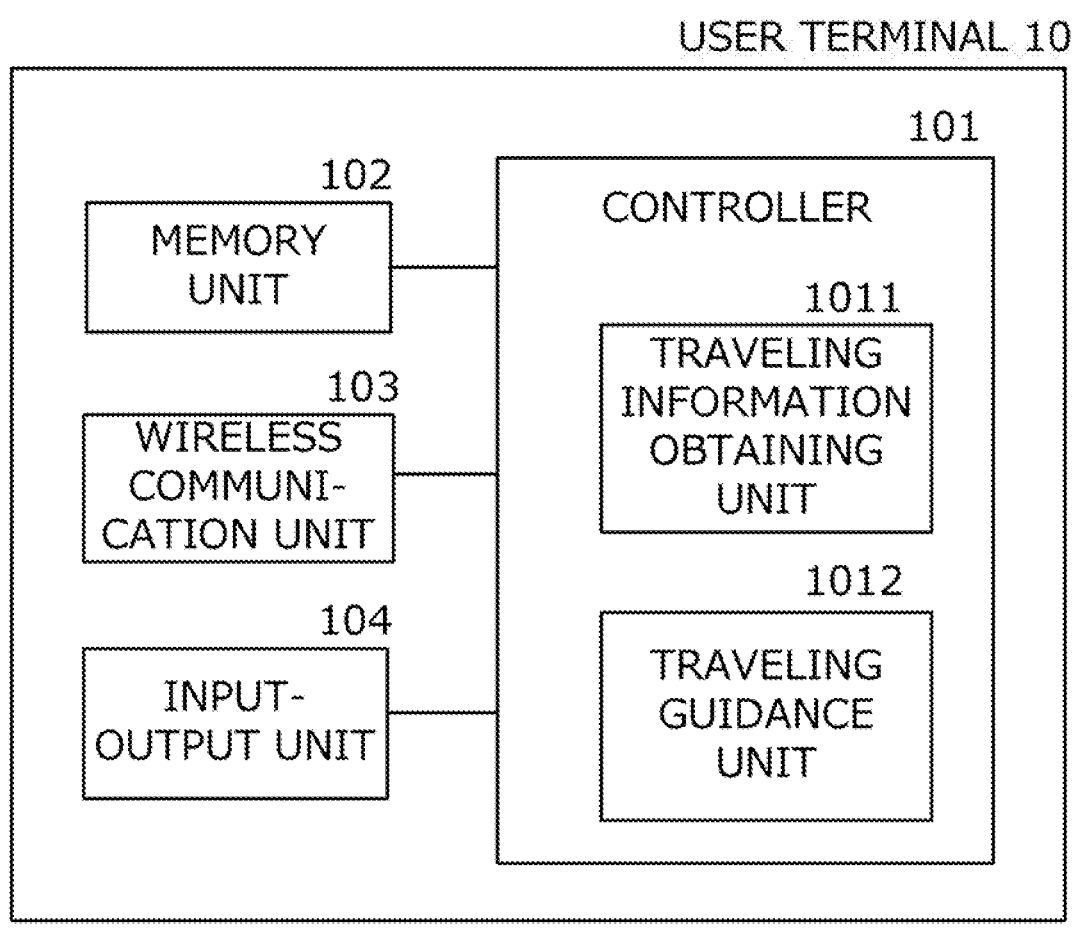
FIG. 2 is a system configuration diagram of a user terminal 10 according to the first embodiment.

The configuration of each user terminal 10 will now be described. FIG. 2 is a diagram illustrating the system configuration of the user terminal 10.

For example, the user terminal 10 is a small computer such as a smartphone, a mobile phone, a tablet computer, a personal information terminal, a notebook computer, or a wearable computer (e.g., a smartwatch). The user terminal 10 includes a controller 101, a memory unit 102, a wireless communication unit 103, and an input-output unit 104.

The controller 101 is an arithmetic unit responsible for the control performed by the user terminal 10. The controller 101 may be a processing unit such as a central processing unit (CPU).

The controller 101 includes two functional modules: a traveling information obtaining unit 1011 and a traveling guidance unit 1012. The functions of the functional modules may be implemented by the CPU executing programs stored in the memory unit 102 described later.

The traveling information obtaining unit 1011 obtains user travelling information. The traveling information obtaining unit 1011 performs different processing depending on the mode of the user terminal 10.

More specifically, when the user terminal 10 is in the first mode (i.e., the mode for users to ride in vehicles driven by other users), the traveling information obtaining unit 1011 obtains information on, for example, the place of departure, the destination, and the date and time for starting traveling. The information is transmitted to the management server 20 as first user information. The first user information includes a combination of the information on the traveling schedule of the first user associated with the information about the first user.

When the user terminal 10 is in the second mode (i.e., the mode for vehicle-driving users), the traveling information obtaining unit 1011 obtains information on, for example, the date and time for starting to drive the vehicle and the traveling route. The information is transmitted to the management server 20 as second user information. The second user information includes a combination of the information on the traveling schedule of the second user associated with the information about the second user.

The management server 20 matches multiple users information items (i.e., matches users to drive vehicles with users to ride in the vehicles) and transmits the resulting matching information to each user terminal 10 owned by the corresponding user.

The traveling guidance unit 1012 provides the vehicle traveling information to the user on the basis of the information transmitted from the management server 20. More specifically, when the user terminal 10 is in the first mode, the traveling guidance unit 1012 allows the input-output unit 104 to notify the first user of, for example, the pickup point, the drop-off point, and the characteristics of the vehicle. When the user terminal 10 is in the second mode, the traveling guidance unit 1012 allows the input-output unit 104 to notify the second user of, for example, the characteristics of the users and the pickup point and drop-off point of each user.

Specific details of the processing will be described later.

The memory unit 102 includes main memory and auxiliary storage. The main memory is memory that receives programs executed by the controller 101 and data used by the control programs. The auxiliary storage is a device that stores the programs executed by the controller 101 and the data used by the control programs. The auxiliary storage may store an application package of the programs executed by the controller 101. The auxiliary storage may also store an operating system that allows these applications to be executed. The programs stored in the auxiliary storage are loaded into the main memory and executed by the controller 101 to implement processing described later.

The main memory may include random access memory (RAM) and read only memory (ROM). The auxiliary storage may include erasable programmable ROM (EPROM) and a hard disk drive (HDD). In addition, the auxiliary storage may include a removable medium, or a portable recording medium. For example, the removable medium is a universal aerial bus (USB) memory or a recording disc medium such as a compact disc (CD) or a digital versatile disc (DVD).

The wireless communication unit 103 is a wireless communication interface that allows the user terminal 10 to be connected to the network. For example, the wireless communication unit 103 provides access to the network via a mobile communication service such as a wireless LAN or the 3G or LTE service.

The input-output unit 104 receives a user input operation and presents information to the user. In the present embodiment, the input-output unit 104 is a single touch panel display. More specifically, the input-output unit 104 includes a liquid crystal display with a control unit for the display and a touch panel with a control unit for the panel.

The configuration illustrated in FIG. 2 is a mere example, and all or some of the illustrated functions may be performed with a dedicated circuit. The illustrated main memory and auxiliary storage may be replaced with any other combination of memory and storage to store and execute the programs.

The configuration of the management server 20 will now be described.

The management server 20 is a typical computer. More specifically, the management server 20 is a computer including processors such as a CPU and a GPU, main memory such as RAM and ROM, and auxiliary storage such as EPROM, a hard disk drive, and a removable medium. For example, the removable medium may be a USB memory or a recording disc medium such as a CD or a DVD. The auxiliary storage stores the operating system (OS), various programs, and various tables. The stored programs are loaded into the work area of the main memory and then executed. The program execution can control each component, thereby achieving functions appropriate for predetermined purposes as described later. However, some or all functions may be implemented with a hardware circuit such as an ASIC or an FPGA. The management server 20 may be a single computer or multiple computers that cooperate with each other.

Figure 3:
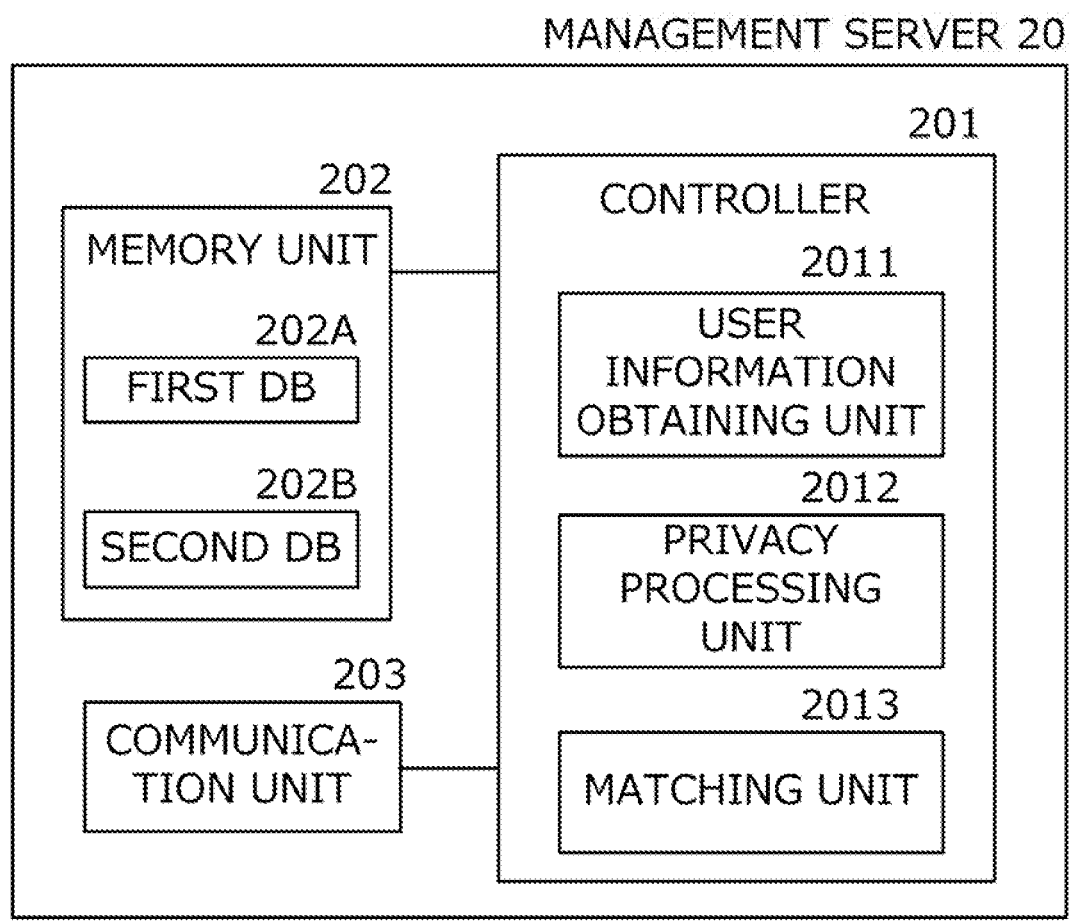
FIG. 3 is a system configuration diagram of a management server 20 according to the first embodiment.

FIG. 3 is a diagram illustrating the system configuration of the management server 20. The management server 20 includes a communication unit 203, a memory unit 202 (a first database 202A, a second database 202B), and a controller 201.

The communication unit 203 is a communication interface that allows the management server 20 to be connected to the network. For example, the communication unit 203 includes a network interface board and a wireless communication circuit for wireless communications.

A memory unit 202 includes main memory and auxiliary storage. The main memory is memory that receives programs executed by the controller 201 and data used by the control programs. The auxiliary storage is a device that stores the programs executed by the controller 201 and the data used by the control programs. The main memory and the auxiliary storage are similar to those in the memory unit 102, and will now be described in detail.

The memory unit 202 also stores the first database 202A and the second database 202B.

The first database 202A is a database that stores first user information obtained from user terminals 10A. The first database 202A stores multiple first user information items obtained from multiple user terminals 10A.

The second database 202B is a database that stores second user information obtained from user terminals 10B. The second database 202B stores multiple second user information items obtained from multiple user terminals 103.

The first database 202A and the second database 202B are created by a processor-executable database management system (DBMS) program managing the data stored in the storage. For example, the first database 202A and the second database 202B are relational databases.

The form of the first user information table stored in the first database 202A will now be described with reference to FIG. 4. FIG. 4 illustrates an example of the form of the first user information table stored in the first database 202A. The first user information table has a user ID field, a place of departure field, a destination field, and a travel starting date and time field.

The user ID field stores user IDs, or identification information for identifying the first users.

The place of departure field stores the place of departure information included in the first user information received from the user terminals 10A. The place of departures may be represented by latitudes and longitudes. However, the places may be represented in any form allowing locations to be identified. For example, addresses or landmark names may also be used.

The destination field stores the destination information included in the first user information received from the user terminals 10A. The destinations may also be represented in any form allowing locations to be identified. In the example in FIG. 4, the latitude and the longitude are used.

The travel starting date and time field stores the travel starting date and time information included in the first user information received from the user terminals 10A. The travel starting dates and times are dates and times at which the first users desire to start vehicle traveling.

The form of the second user information table stored in the second database 202B will now be described with reference to FIG. 5. FIG. 5 illustrates an example of the form of the second user information table stored in the second database 202B. The second user information table has a user ID field, a traveling route field, and a travel starting date and time field.

The user ID field stores user IDs, or identification information for identifying the second users.

The traveling route field stores the traveling route information included in the second user information received from the user terminals 10B. The traveling route information identifies the traveling routes of the vehicles driven by the second users. For example, the traveling routes may be represented by sets of passage points or sets of nodes and links corresponding to a road network.

The travel starting date and time field stores the travel starting date and time information included in the second user information received from the user terminals 10B. The travel starting dates and times are dates and times at which the second users desire to start vehicle traveling.

The controller 201 is an arithmetic unit responsible for the control performed by the management server 20. The controller 201 may be a processing unit such as a CPU.

The controller 201 includes three functional modules: a user information obtaining unit 2011, a privacy processing unit 2012, and a matching unit 2013. The functions of the functional modules may be implemented by the CPU executing programs stored in the auxiliary storage.

The user information obtaining unit 2011 obtains the first user information from a user terminal 10A and updates the first database 202A. The user information obtaining unit 2011 also obtains the second user information from a user terminal 10B and updates the second database 202B. The obtained and stored user information is used for matching processing described later.

The privacy processing unit 2012 determines the point at which each first user actually gets out of the vehicle, on the basis of the desired drop-off point included in the obtained first user information. In this manner, separating the actual drop-off point from the point at which the first user desires to get out can conceal the first user's sphere-of-life information including the home and office.

The matching unit 2013 matches users on the basis of the first user information and the second user information after the privacy processing.

The matching processing in the present embodiment matches a first user and a second user for the first user to travel to the destination in the vehicle driven by the second user.

The matching unit 2013 also generates matching information on the basis of the matching results. The matching information includes information about whether matching is successfully established. In the matching processing, if a first user and a second user are successfully matched, the matching unit 2013 generates matching information including personal information about the matching partner (for example, the name, the telephone number, the mail address).

The generated matching information is transmitted to the user terminal 10A and the user terminal 10B. As a result, each of the first and second users successfully matched receives the personal information about the corresponding matching partner. This allows contact between the first and second users successfully matched.

Figure 6:
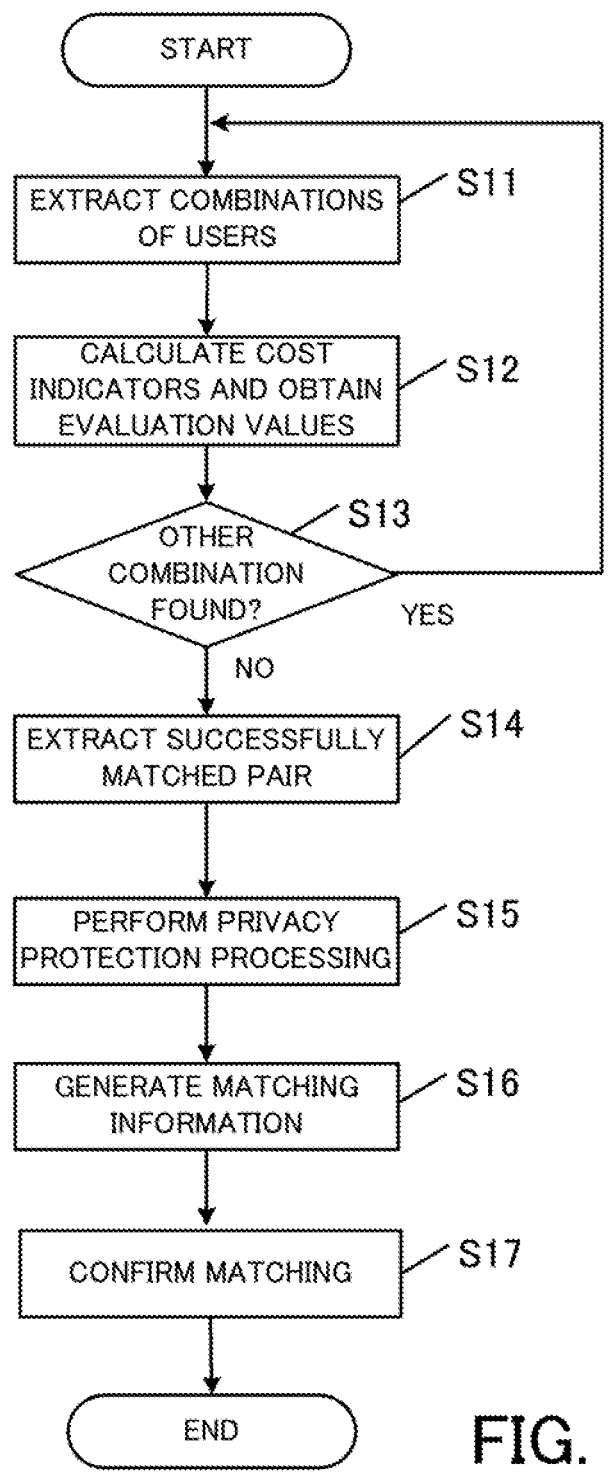
FIG. 6 is a flowchart of the processing performed by the management server 20.

The matching processing performed by the controller 201 will now be described in detail with reference to the flowchart illustrated in FIG. 6. The matching processing is periodically performed while the first database 202A stores first user information and the second database 202B stores second user information. Unless otherwise specified, the processing is performed by the matching unit 2013.

For example, the matching processing can be performed based on the costs of multiple users sharing the same vehicle. For example, if a first user at the place of departure walks onto the traveling route of a vehicle driven by a second user to ride in this vehicle, the distance moved and the time taken for the movement are costs. If a vehicle driven by a second user deviates from the original traveling route to pick up a first user, the distance moved away from the original traveling route and the time taken for the movement are costs.

Likewise, if the first user walks to the destination after getting out of the vehicle, the distance moved and the time taken for the movement are also costs. In addition, if the time when the first user starts traveling is different from the time when the second user comes close to the first user, the time difference is a cost. In the matching processing, for example, one or more indicators of these costs may be calculated for every user pair, and the users having the lowest total of indicators may be paired.

Although the matching in the example described below is based on cost indicators, this matching method is a mere example, and any other technique may be used. For example, matching may be based on the shortest distance in a space-time network or based on other criteria. When multiple indicators are used, each indicator may also be weighted.

First, in step S11, each record of first user information and each record of second user information to be compared are obtained from the first database 202A and the second database 202B. Note that the user information may be obtained in any order as long as every combination of user information can be compared.

In step S12, cost indicators are calculated based on the extracted first user information and second user information. Examples of the calculated cost indicators include costs before a first user rides in a vehicle, costs after a first user gets out of a vehicle, and a cost corresponding to a waiting time. The indicators are combined to calculate aggregate scores indicating matching appropriateness (hereinafter, matching scores). For example, the matching scores increase as the matching costs decrease. The calculated matching scores are temporarily stored for each pair of the first users and the second users.

In step S13, the processing checks whether there is any combination of user information, the matching score of which has not been calculated. If yes, the processing returns to step S11 and continues. If no, the processing advances to step S14.

In step S14, the matching results are sorted based on the calculated matching scores, and a successfully matched user information pair is extracted. For example, a user information pair having a matching score smaller than a threshold may be determined to be successfully matched. If a first user has multiple second users who are matching candidates, any one of the second users may be selected based on other criteria. For example, if items such as sex and age are preferably taken into account, the matching partner may be selected based on such items. If a user has no partner satisfying the user's criteria, the user may be determined to be unsuccessfully matched. In this case, matching information indicating the unsuccessful matching is generated in step S16 described later.

When matching is successfully established, the point at which the first user actually rides in the vehicle (hereinafter, the pickup point) is determined, and the point at which the first user gets out of the vehicle (hereinafter, the drop-off point) is also determined. The pickup point and the drop-off point may not be the same as the place of departure and the destination, respectively, designated by the first user. The pickup point and the drop-off point are determined also based on the traveling route of the vehicle driven by the second user.

For the successfully matched pair, privacy protection processing is performed in step S15.

The privacy protection processing will now be described in detail.

The matching system according to the present embodiment matches a large number of unspecified users, and thus the personal information about a user is preferably prevented from being unnecessarily disclosed to other users. However, since a ride-sharing user gets in and out of a vehicle near points quite close to the sphere of the user's life such as the home and the office, another person in the same vehicle who sees the user get in or out can infer the user's home or office.

To avoid the difficulty, the matching system according to the present embodiment does not directly use the destination included in the first user information as the drop-off point. The matching system intentionally shifts the drop-off point from the destination and then notifies the second user of the information on the drop-off point.

A specific method will now be described as an example with reference to FIG. 7.

Figure 7:
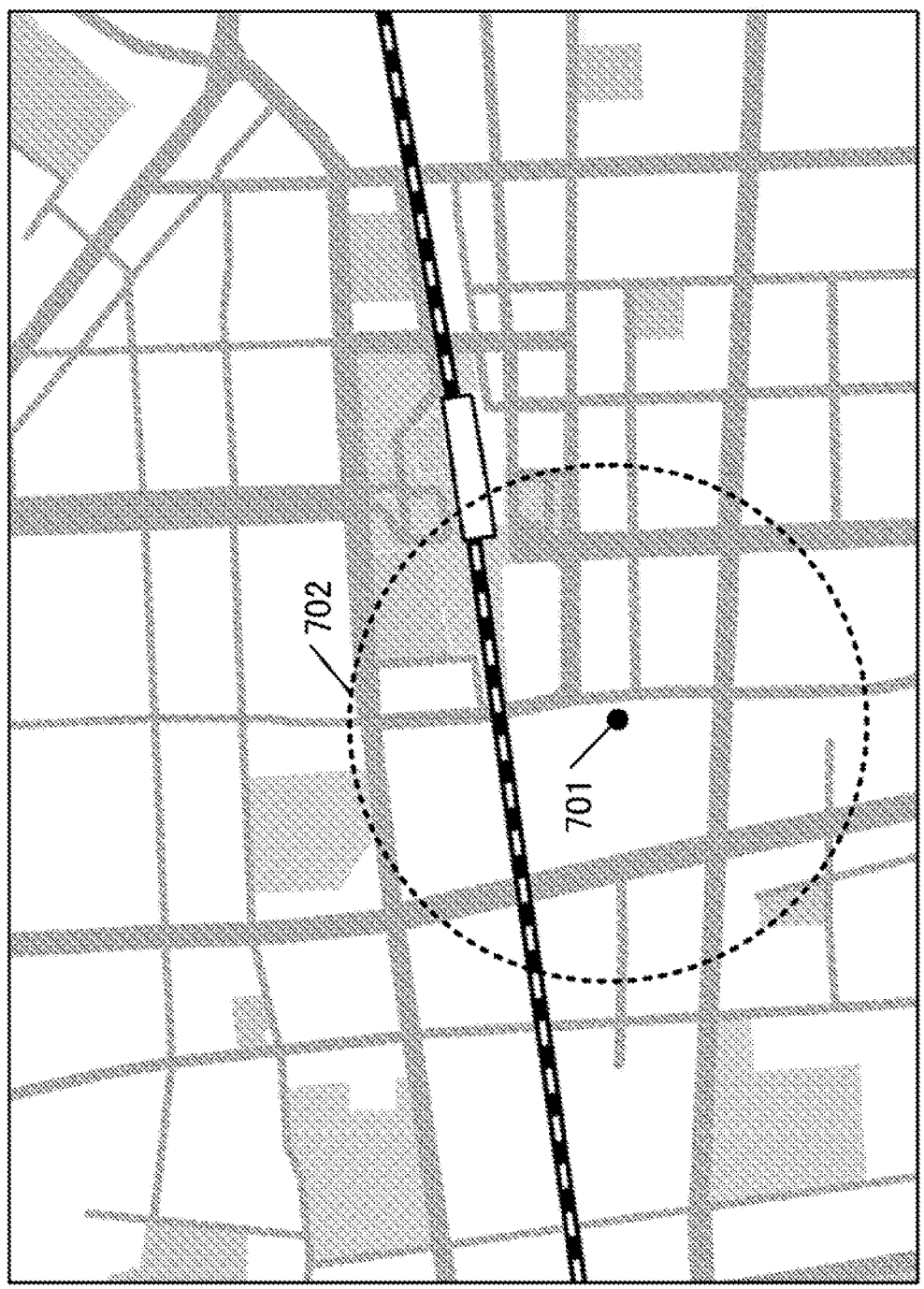
FIG. 7 illustrates the relationship between a destination and a drop-off area.

In FIG. 7, reference numeral 701 denotes the destination included in the first user information. As illustrated, when a point is designated as the destination of the first user, the privacy processing unit 2012 in step S15 generates a predetermined field including the destination (hereinafter, the drop off area, denoted by reference numeral 702), and determines a drop-off point as a point included in the drop-off area and at which a vehicle can be stopped. Although the drop-off point is determined at random in the present embodiment, the point may also be determined based on a predetermined rule. If a drop-off point is determined based on a predetermined rule, preferably the point is not far remote from the traveling route of the vehicle. The drop-off area is preferably a sphere that can be walked through. If the drop-off area includes no vehicle traveling route or the destination of the first user is far remote from the vehicle traveling route, the processing of step S15 may be skipped.

The determined drop-off point is transmitted to the matching unit 2013 and temporarily stored.

In step S16, matching information is generated for each of the successfully matched first and second users.

The matching information provided to the first user includes the information on the vehicle driven by the second user (e.g., the license plate and the vehicle model information), the pickup point, the drop-off point after the privacy protection processing, and the personal information about the second user. The matching information provided to the second user includes the first user pickup point, the drop-off point after the privacy protection processing, and the personal information about the first user. The generated matching information is transmitted to each of the user terminal 10A for the first user and the user terminal 103 for the second user.

The information on the vehicle driven by the second user, the personal information about the first user, and the personal information about the second user may be obtained from a personal information database that stores the personal information about each user. In this case, the above-described matching information can be generated by extracting the personal information about the matched first and second users from the personal information database. The personal information may not be information for identifying the individuals. The personal information may be the minimum information needed for the first user and the second user to meet, such as sex, age, and characteristics of appearance.

When the first user and the second user check and approve the matching information, the approval is transmitted from the user terminals 10 to the management server 20. The matching unit 2013 then determines that the successful matching is confirmed, and notifies each user terminal 10 of the determination (step S17). If any one of the users declines the matching, the matching processing may be performed again with this user excluded.

As described above, the matching system according to the first embodiment, when matching users who share a vehicle, generates the drop-off point at random on the basis of the designated destination. Such a process enables the first user's destination (for example, the home) to be concealed from the person in the same vehicle.

Modification of First Embodiment

Although the drop-off point is determined at random within a predetermined drop-off area in the first embodiment, the drop-off point may be determined based on the geographical positional relationship with the destination.

For example, the drop-off point may be determined with priority given to a point at which the destination of the first user cannot be seen from within the stopped vehicle, rather than a point at which the destination of the first user can be seen from within the stopped vehicle.

In addition, the drop-off point may be determined also based on the traveling direction of the vehicle at the time of the first user getting out. For example, the drop-off point may be determined so that the vehicle faces in the direction opposite to the destination of the first user when the first user gets out.

In this modification, the first user leaving the vehicle is not easily seen by the person in the vehicle, and thus the first user's home and office become more difficult to identify.

Second Embodiment

In the first embodiment, the drop-off point is determined at random within a predetermined drop-off area. In a second embodiment, multiple road segments within a drop-off area are given scores, based on which the drop-off point is determined.

Figure 8:
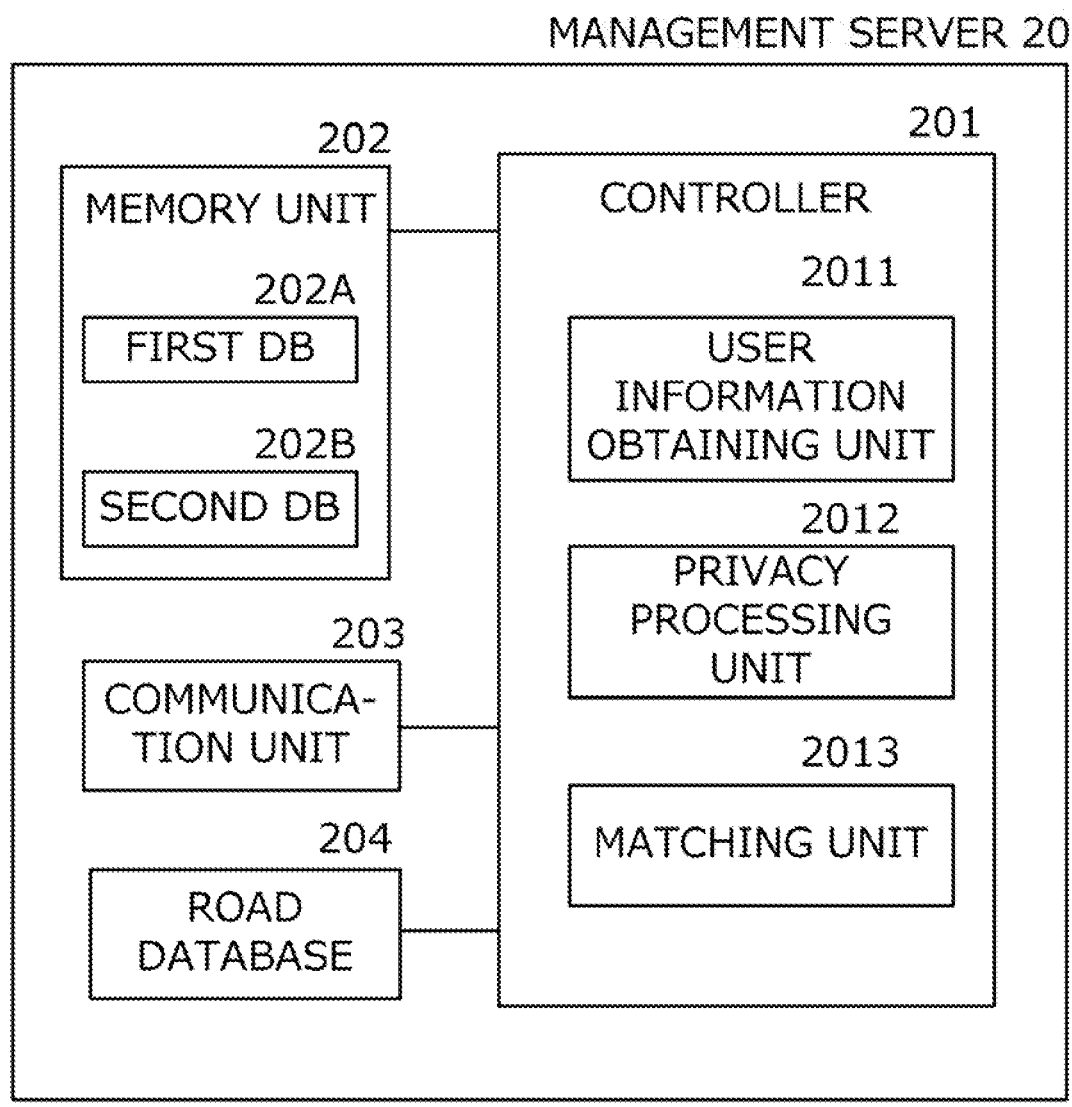
FIG. 8 is a system configuration diagram of a management server 20 according to a second embodiment.

FIG. 8 is a block diagram schematically illustrating a management server 20 included in a matching system according to the second embodiment. As shown in FIG. 8, the management server 20 in the present embodiment further includes a road database 204.

The road database 204 stores environmental information about roads traveled by vehicles (hereinafter, the road environment information). Examples of the road environment information include the presence or absence of sidewalks, the road width, the number of traffic lanes, the traffic density, and the presence or absence of a one-way street. However, the road database 204 may store other information. In the second embodiment, the road environment information is determined for each road section having a predetermined length (road segment). The road environment information is stored in association with information indicating the geographical position of the road segment. FIG. 9A illustrates an example of the road environment information associated with each road segment.

Figure 10:
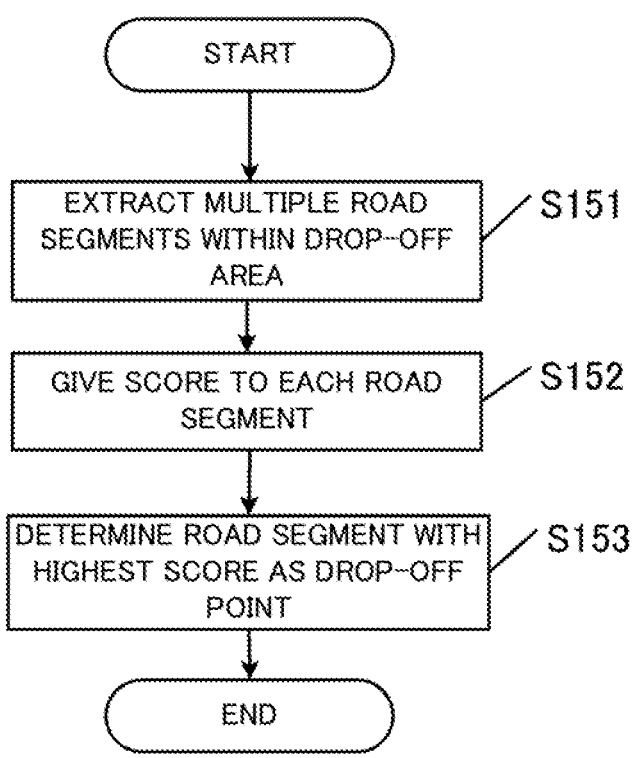
FIG. 10 illustrates privacy protection processing in the second embodiment.

FIG. 10 is a flowchart illustrating details of the processing in step S15 performed by the privacy processing unit 2012 in the second embodiment.

Figure 11:
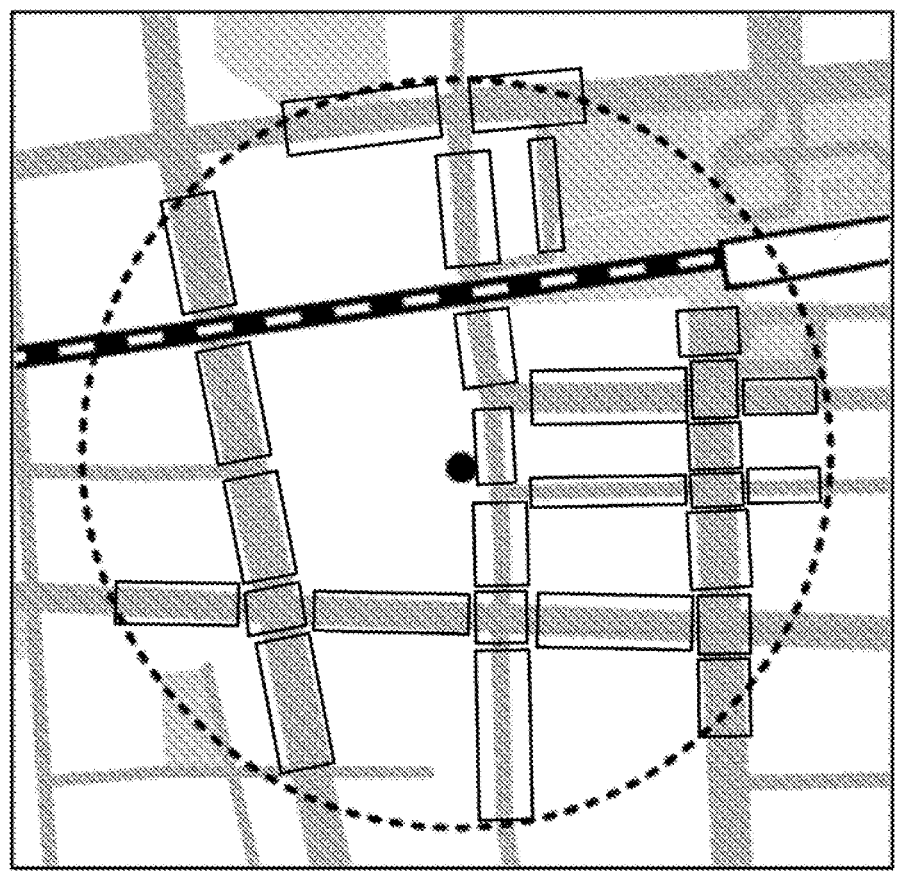
FIG. 11 illustrates the road segments included in a drop-off area.

First, in step S151, the road environment information stored in the road database 204 is referred to and the multiple road segments within the drop-off area are obtained. FIG. 11 illustrates an example of multiple road segments within a drop-off area. The same road may also have different road segments for different directions. In this case, a road segment that will not be traveled by the vehicle may be excluded (for example, a road segment in the direction back to the place of departure).

Next, in step S152, each of the obtained multiple road segments is given a score. In the present embodiment, the score is given based on a criterion associated with the first user's preference.

In the second embodiment, the first user information includes criterion information for scoring. The management server 20 gives scores to road segments based on the criterion.

For example, if the first user desires to get out at a point having much traffic, the management server 20 gives a score to each road segment based on the traffic density included in the road environment information. The traffic density may be the number of traveling vehicles or the number of traveling pedestrians.

For example, if the first user desires to get out on a road with a sidewalk, the management server 20 gives a score to each road segment based on the sidewalk presence or absence information included in the road environment information. In other cases, scores may be given based on the road width or the brightness at night.

The scoring may be based on a single criterion or multiple criteria. For example, multiple scores may be calculated based on multiple criteria and then summed up. In this case, any criteria may be weighted.

Next, in step S153, the segment with the highest score is selected from the multiple road segments within the drop-off area and determined as the drop-off point.

In this manner, the second embodiment allows a road segment satisfying the first user's preference to be selected from the road segments within the drop-off area, and enables the first user to get out at the selected road segment.

Third Embodiment

In the second embodiment, the drop-off point scoring is based on the road environment. In a third embodiment, the drop-off point scoring is based on the presence of a structure or a landmark.

The management server 20 included in a matching system according to the third embodiment has the same configuration as in the second embodiment. However, the third embodiment is different from the second embodiment in that the road database 204 further stores structure or landmark information (spot information). FIG. 9B illustrates an example of the spot information.

Examples of the spot information include the positions of a building and a facility and the type, size, and tenant information about the building and the facility. The spot information may not correspond to a building or a facility. For example, the spot information may correspond to a scramble intersection or a spot for meeting.

In the third embodiment, the first user information includes an item regarding a spot desired to be used at the drop-off point. The management server 20 gives scores to road segments on the basis of the item. For example, when the first user expresses a desire to use a bank ATM, the management server 20 extracts a spot at which a bank ATM can be used, and gives high scores to road segments near the spot.

The scoring may be based on a single criterion or multiple criteria. For example, multiple scores may be calculated based on multiple criteria and then summed up. In this case, any criteria may be weighted.

In this manner, the third embodiment enables an appropriate drop-off point to be determined based on information about spots such as a structure and a landmark.

Modification of Third Embodiment

If a spot in the third embodiment has multiple entrances and multiple road segments are available, different entrances may be given different scores. For example, if a railroad station has a north entrance and a south entrance and the destination is near to the south entrance, the road segment adjacent to the north entrance may be given a higher score. This is because the user needs to pass through the station to reach the destination, and thus the destination is difficult to infer from the drop-off point.

Figure 12:
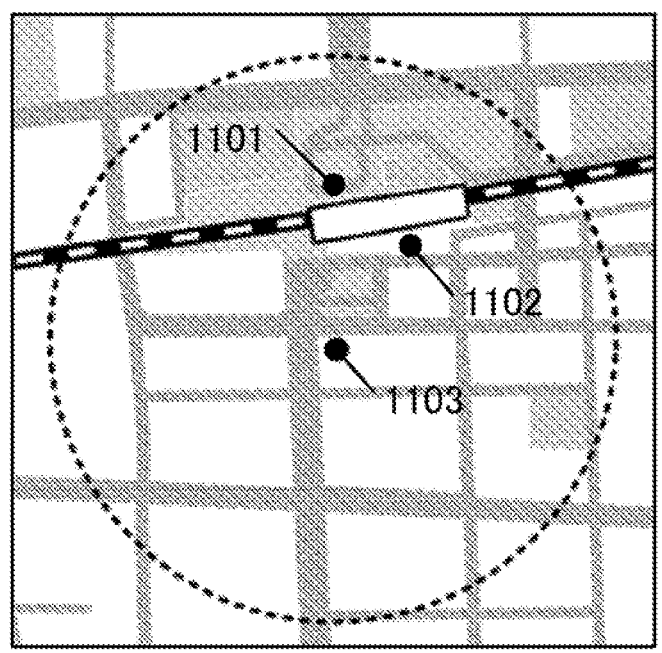
FIG. 12 illustrates an example in which a drop-off point is determined based on a landmark.

This will now be described as an example with reference to FIG. 12. For example, if the destination (reference numeral 1103) is near to a railroad station and an area around the station is defined as the drop-off area, a higher score may be given to a road segment adjacent to the point denoted by reference numeral 1101 than to a road segment adjacent to the point denoted by reference numeral 1102.

In this manner, if the destination is more difficult to infer from the drop-off point, a higher score may be given. For example, if a structure that can be passed through is located between a particular road segment and the destination or there is a spot where many people gather, between a particular road segment and the destination, then the road segment may be given a higher score.

Other Modifications

The above embodiment is a mere example. The present invention may be modified as appropriate without departing from the gist.

For example, although the roads within a drop-off area are divided into multiple road segments in the second and third embodiments, the division may not be based on road segments. For example, a grid with a predetermined shape may be superimposed over the drop-off area. The determination may also be performed not for each area but for each point.

In the second and third embodiments, all the road segments within the drop-off area are given scores. However, all road segments may not be given scores. For example, a single drop-off point may be evaluated based on the evaluation criterion described herein.

In the description of the embodiments, second users drive vehicles. However, a first user may ride in an autonomous vehicle. In this case, instead of transmitting the matching information to a second user, the corresponding information may be transmitted to the computer installed in the autonomous vehicle. Even in the case that a vehicle travels without a second user, the destination can be advantageously concealed from the fellow passenger.

In the description of the embodiments, the management server 20 determines the drop-off point. In some cases, the first user may check the determined drop-off point and request the regeneration of a drop-off point. In addition, the first user may also change the drop-off point determined by the management server 20.

The processing and means described in the present disclosure may be freely combined and implemented without compromising the technical consistency.

Processing described as being performed by a single device may also be shared and performed by multiple devices. Conversely, processing described as being performed by different devices may also be performed by a single device. In the computer system, the hardware configuration (server configuration) for implementing each function may be modified flexibly.

The present invention can be embodied by providing a computer with computer programs for implementing the functions described in the above embodiments, and causing one or more processors in the computer to read and execute the programs. Such a computer program may be provided to the computer over a network or via a non-transitory computer-readable storage medium connectable to a system bus for the computer. Examples of the non-transitory computer-readable storage medium include any type of disks such as a magnetic disk (e.g., a floppy (registered trademark) disk, a hard disk drive (HDD)) and an optical disk (e.g., CD-ROM, DVD, Blu-ray Disc), read only memory (ROM), random access memory (RAM), EPROM, EEPROM, a magnetic card, flash memory, an optical card, and any other type of media appropriate to the storage of electronic instructions.

What is claimed is:

1. An information processing apparatus for determining a pickup point and a drop-off point for a first user traveling to a destination in a vehicle carrying a plurality of unspecified users, the apparatus comprising:
a controller configured to:
obtain information on a place of departure and a destination of the first user;
determine a pickup point for the first user based on the place of departure of the first user;
define a predetermined field including the destination of the first user and determine a drop-off point for the first user from a plurality of points except the destination, the points being included in the predetermined field;
give an evaluation value to a point on a road within the predetermined field based on a criterion selected by the first user, and determine the drop-off point based on the given evaluation value; and
transmit the determined pickup point and drop-off point for the first user to a device associated with the vehicle.

2. The information processing apparatus according to claim 1, wherein
the device associated with the vehicle is a terminal owned by a second user driving the vehicle or an on-vehicle terminal incorporated in the vehicle to designate a traveling route of the vehicle.

3. An information processing method implemented by an information processing apparatus for determining a pickup point and a drop-off point for a first user traveling to a destination in a vehicle carrying a plurality of unspecified users, the method comprising:
obtaining user information including information on a place of departure and a destination of the first user;
determining a pickup point for the first user based on the place of departure of the first user;
defining a predetermined field including the destination of the first user and determining a drop-off point for the first user from a plurality of points except the destination, the points being included in the predetermined field;
giving an evaluation value to a point on a road within the predetermined field based on a criterion selected by the first user, and determining the drop-off point based on the given evaluation value; and
transmitting the determined pickup point and drop-off point for the first user to a device associated with the vehicle.

4. A non-transitory computer readable storing medium recording a computer program for causing an information processing apparatus for determining a pickup point and a drop-off point for a first user traveling to a destination in a vehicle carrying a plurality of unspecified users, to perform a method comprising the steps of:
obtaining user information including information on a place of departure and a destination of the first user;
determining a pickup point for the first user based on the place of departure of the first user;
defining a predetermined field including the destination of the first user and determining a drop-off point for the first user from a plurality of points except the destination, the points being included in the predetermined field;

giving an evaluation value to a point on a road within the predetermined field based on a criterion selected by the first user, and determining the drop-off point based on the given evaluation value; and transmitting the determined pickup point and drop-off point for the first user to a device associated with the vehicle.

* * * * *